United States Patent
Sun et al.

(10) Patent No.: US 11,106,386 B1
(45) Date of Patent: Aug. 31, 2021

(54) DYNAMIC THROTTLING OF CAPACITY RECLAMATION

(71) Applicant: Amazon Technologies, Inc., Seattle, WA (US)

(72) Inventors: Boyan Sun, Seattle, WA (US); Amol Madhav Joshi, Seattle, WA (US); Matthew John Surawski, Seattle, WA (US); Rahul Upadhyaya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 16/416,694

(22) Filed: May 20, 2019

(51) Int. Cl.
*G06F 3/06* (2006.01)
*G06F 16/2455* (2019.01)

(52) U.S. Cl.
CPC ............ *G06F 3/0652* (2013.01); *G06F 3/067* (2013.01); *G06F 3/0608* (2013.01); *G06F 3/0644* (2013.01); *G06F 3/0659* (2013.01); *G06F 16/2455* (2019.01)

(58) Field of Classification Search
CPC ...... G06F 3/0652; G06F 3/0659; G06F 3/067; G06F 3/0644; G06F 3/0608; G06F 16/2455
See application file for complete search history.

(56) References Cited

U.S. PATENT DOCUMENTS 9,063,946 B1 * 6/2015 Barber .................. G06F 16/125

OTHER PUBLICATIONS

Waizenegger, Tim. "Deletion of content in large cloud storage systems." (Year: 2017).*

* cited by examiner

*Primary Examiner* — Ramon A. Mercado
(74) *Attorney, Agent, or Firm* — Nicholson DeVos Webster & Elliott LLP

(57) ABSTRACT

Techniques for dynamic throttling of capacity reclamation are described. A method of dynamic throttling of capacity reclamation may include obtaining a plurality of deletion requests, the plurality of deletion requests including client device-originating deletion requests and service-originating deletion requests, generating a plurality of deletion tasks corresponding to the plurality of deletion requests, determining a deletion request rate associated with the client device-originating deletion requests based on request metadata, and executing the plurality of deletion tasks based on the deletion request rate.

18 Claims, 8 Drawing Sheets

US 11,106,386 B1

DYNAMIC THROTTLING OF CAPACITY RECLAMATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Such resources can be added and removed dynamically based on customer demand. This requires accurate and timely resource management by the service provider on behalf of the customers.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for dynamic throttling of capacity reclamation. When customers of a service provider network want to stop using a particular resource (e.g., a storage volume, a database, a computing instance) they can indicate that this resource should be deleted. This customer request can trigger a "soft delete" in which the resource is inactive, and the customer is no longer billed, but the data corresponding to the resource is still present on one or more computing devices in the service provider network. In order to reclaim this unused capacity for use by other resources, a deletion management service can periodically hard delete resources which have been soft deleted. A hard delete as used herein refers to removal of the data from the computing device. The deletion management service can periodically retrieve a batch of deletion requests from a data store and send a batch of corresponding cleanup requests (e.g., hard delete tasks) to be executed. However, each batch results in a spike of hard delete requests, which can lead to scaling issues (e.g., to accommodate the traffic spikes) as well as data integrity concerns (e.g., to ensure the correct data is being deleted based on a valid deletion request). Embodiments address these concerns by throttling the hard delete tasks to match a rate of soft delete requests received from one or more customers. This smooths out traffic spikes and limits the negative impact of hard-deleting the wrong data.

Figure 1:
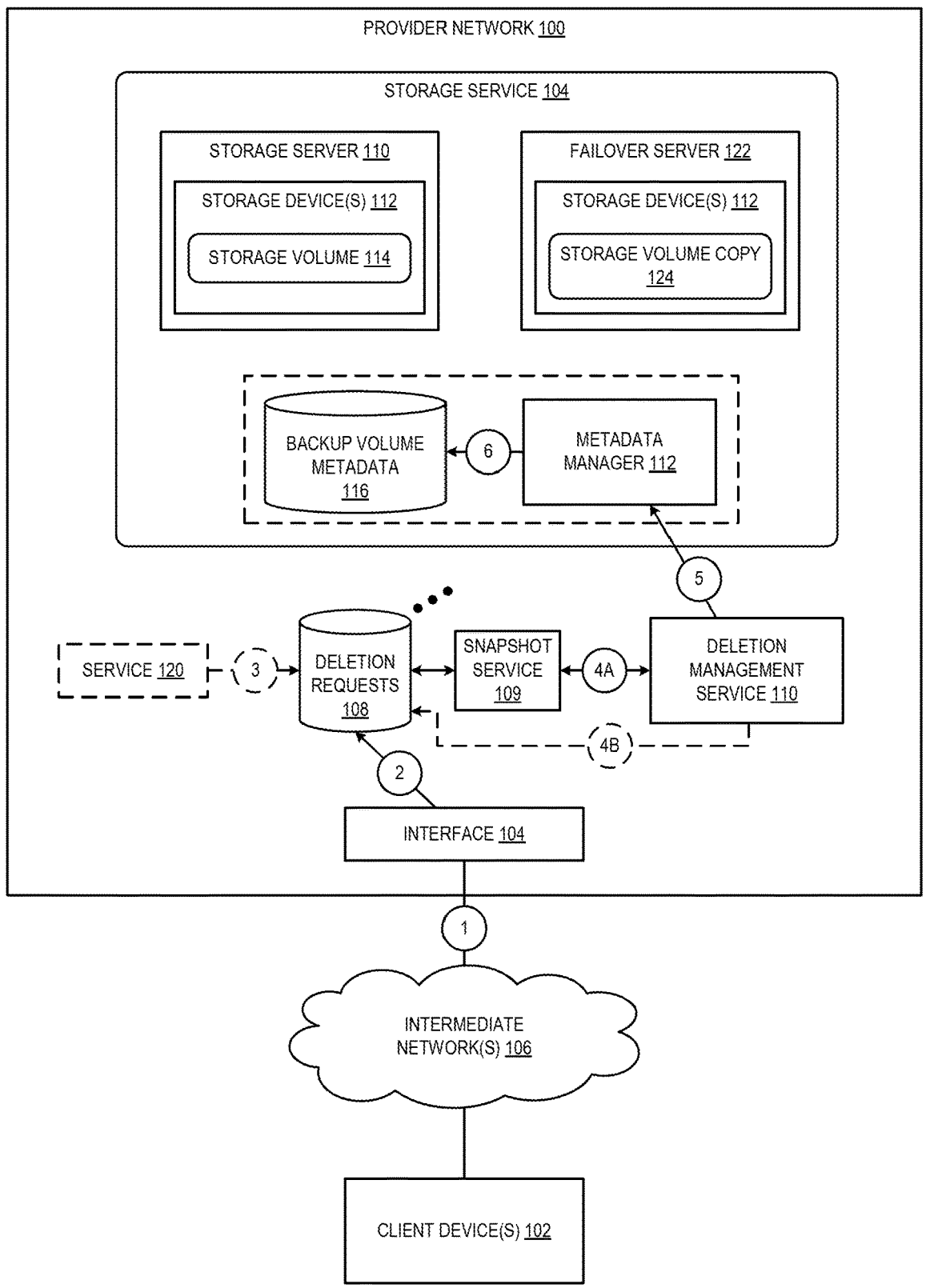
FIG. 1 is a diagram illustrating an environment for dynamic throttling of capacity reclamation according to some embodiments.

FIG. 1 is a diagram illustrating an environment for dynamic throttling of capacity reclamation according to some embodiments. In an embodiment, storage service 104 may operate as part of a provider network 100 and comprises one or more software modules executed by one or more electronic devices at one or more data centers and geographic locations. The service network 100 in FIG. 1 shows only a storage service 104 for illustrative purposes; in general, a provider network 100 may provide many different types of services as part of the provider network 100. Although the distributed storage environment in FIG. 1 is shown in the context of a storage service 104 in a provider network 100, in general, the embodiments described herein can be used in various services that maintain resources on behalf of customers which the customers can delete on demand.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) 104, such as through use of application programming interface (API) calls, via a console implemented as a website or application, etc. The interface(s) 104 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, a provider network 100 can include a storage service 104 that provides persistent block storage volumes (for example, storage volumes 114) for use with various types of compute instances and other computing resources in the provider network 100. In some embodiments, storage volumes provided by a storage service 104 can be replicated within the provider network to protect against various types of failures, offering high availability and durability for the storage volumes. In general, each storage volume can provide any amount of storage capacity depending on a customer's needs (for example, a provider network 100 may provide storage volumes ranging from 1 GB to 16 TB in size or any other range). Once a storage volume is created at a storage service 104, it can be attached to a compute instance (for example, a compute instance hosted by a client computing device 106 managed by a hardware virtualization service 102), where attachment refers to the ability of the instance to use the volume as its virtualized disk. Once a storage volume 114 is attached to a compute instance, the volume appears to the compute instance as a mounted device similar to any hard drive or other block device. At that point, a compute instance can interact with the volume just as it would with a local drive, formatting it with a file system or installing applications on it directly. Typically, a storage volume 114 is attached to only one compute instance at a time, but many storage volumes 114 can be attached to a single compute instance.

In various embodiments, backup volume metadata can be maintained by a storage service to identify both storage volumes 114 and their corresponding storage volume copies 124 within the storage service. The backup volume metadata can be maintained in a backup volume metadata data store 116 or other location accessible to the storage service. When a customer deletes a resource in provider network 100, the deleted resource can be marked as "soft deleted." The resource can be removed from being associated with the customer, and the customer may lose access to the resource. However, the resource may not be deleted immediately from the provider network. At a later time, a deletion management service can hard delete (or instruct another service to perform the actual hard delete) of the soft deleted resources. By not deleting the resources immediately, this improves the customer experience by removing the resource from the customer's account immediately but maintaining the resource for a particular period of time (e.g., 1 hour, 1 day, or other configurable amount of time) during which the resource is recoverable if it was deleted in error.

Depending on the resource being deleted, different services may be invoked to perform the actual hard delete. For example, in the storage service use case, a customer can send a request from client device 102 to interface 104 over one or more intermediate networks 106, as shown at numeral 1. The request can be to delete a particular resource or resources and the request may include an identifier associated with the resource to be deleted. In some embodiments, authorization and/or authentication may be performed on the requestor to ensure that the requestor is authorized to delete the particular resource. In some embodiments, the request may include credentials associated with the requestor to be used to authorize/authenticate the requestor before deleting the resource.

Interface 104 may include an application programming interface (API), graphical user interface (GUI), such as a console or application or other interface. In some embodiments, the interface may be implemented by client device 102 in an application implementing a software development kit (SDK) published by provider network 100. When a deletion request is received and authorized/authenticated by interface 104, a timestamp, requestor identifier, or other metadata can be added to the deletion request and the deletion request can be added to a deletion request data store 108, as shown at numeral 2. Deletion request data store 108 can include a database table, block store, object store, or other data store that maintains each deletion request as it is received until the corresponding resource has been hard deleted. Although a single data store 108 is shown, in various embodiments deletion requests may be stored in a plurality of data stores. In some embodiments, a snapshot service 109 can periodically take snapshots of the deletion request data store 108 (or a plurality of deletion request data stores). The snapshot service 109 can identify deletion requests associated with resources which can be reclaimed. For example, resources owned by a customer can be reclaimed by the storage service 104. The snapshot service can identify resources owned by a customer and make the deletion requests associated with those resources available to deletion management service 110.

In some embodiments, metadata associated with a resource to be deleted may also be hard deleted in addition to the actual resource itself. For example, as discussed, a storage service may maintain backup volume metadata for each storage volume and corresponding storage volume copy in the storage service. When a deletion request is received for a storage volume, it is added to the deletion requests data store 108. A deletion management service 110 can query the deletion request data store 108 to obtain pending deletion requests. For example, the deletion management service 110 can request a batch of deletion requests to process (e.g., N oldest deletion requests, where N is an integer), as shown at numeral 4A, via snapshot service 109. In some embodiments, the deletion management service may additionally, or alternatively, obtain deletion requests from the deletion request data store 108 directly, as shown at numeral 4B. As discussed above, the deletion requests may include only deletion requests associated with resources that can be reclaimed, such as customer-owned resources. In some embodiments, the deletion management service 110 may request a batch of deletion requests that are at least an hour old (or other configurable time period). This provides a built-in minimum buffer period between submission of the delete request and execution of the corresponding hard delete task. The deletion management service 110 may generate one or more hard delete tasks from each deletion request in the batch of deletion requests. For example, for a storage volume deletion request, the deletion management service 110 may generate a hard delete task for the volume metadata, for the volume itself, and for the backup metadata for the volume being deleted. Each of these hard delete tasks may be send to a corresponding manager to be executed to perform the hard delete. As shown in FIG. 1, a metadata manager 112 in storage service 104 may receive a hard delete task from deletion management service 110 at numeral 5. This hard delete task may correspond to the backup metadata for the volume to be deleted. Metadata manager 112 can then execute the hard delete task which deletes the corresponding backup volume metadata from backup volume metadata data store 116, at numeral 6.

When a batch of deletion requests is processed by deletion management service 110 into a batch of hard delete tasks, these hard delete tasks may be sent to the metadata manager 112 all at once. This leads to a spike in traffic which may not be able to be processed as the service increases in size (e.g., user base, number of volumes, etc.). Additionally, there may not be any safeguards on the processing of the hard delete tasks. For example, once a deletion request is received, it may be processed without additional input, resulting in data being hard deleted even if the initial request was made in error. To address these issues, the execution of the hard delete tasks may be throttled based on the rate at which deletion requests are received from customers.

As shown in FIG. 1, the deletion requests data store may include deletion requests that originate from a client device (e.g., customer deletion requests), and deletion requests that originate from a service (e.g., service deletion requests). As noted above, requests received through interface 104 may include a timestamp that is added when a request is received. These timestamps can be used to determine the rate at which customer deletion requests are being received. The rate at which the hard delete tasks are executed can then be throttled to match the rate at which customer deletion requests are being received. This smooths out any spikes in hard delete traffic that may be attributed to service deletion requests. The service deletion requests may be generated automatically by other services 120 in provider network 100. These may be generated due to legitimate resource management operations or inadvertently due to bugs or other errors in the requesting service or provider network 100. For example, during provisioning of a new volume in storage service 104, the provisioning may be aborted or otherwise interrupted. A partially provisioned volume may need to be cleaned-up so that the volume can be reclaimed and fully provisioned in response to a request for a new volume. A service 120 may be responsible for cleaning up such partially provisioned resources and, as part of legitimate resource management, may send a deletion request to delete the partially provisioned volume. If the processing of all deletion requests (including both service deletion requests and customer deletion requests) is throttled according to customer deletion request rate, then the processing of hard delete tasks are slowed. Additionally, if a large number of service deletion requests are received compared to the number of customer deletion requests, a large number of hard delete tasks may be throttled. If the number of throttled tasks exceeds a threshold number, an alarm may be generated to alert another service, administrator, or other entity to more closely inspect the service deletion requests to ensure they are not being generated due to a bug or other error.

In some embodiments, deletion management service 110 can call one or more serverless functions to obtain deletion requests, to generate hard delete tasks, to determine the deletion request rate, and other functions described herein. For example, in various embodiments, a "serverless" function may include code provided by a user or other entity that can be executed on demand Serverless functions may be maintained within provider network 100 and may be associated with a particular user or account, or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an application programming interface ("API") call or a specially formatted HyperText Transport Protocol ("HTTP") request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Figure 2:
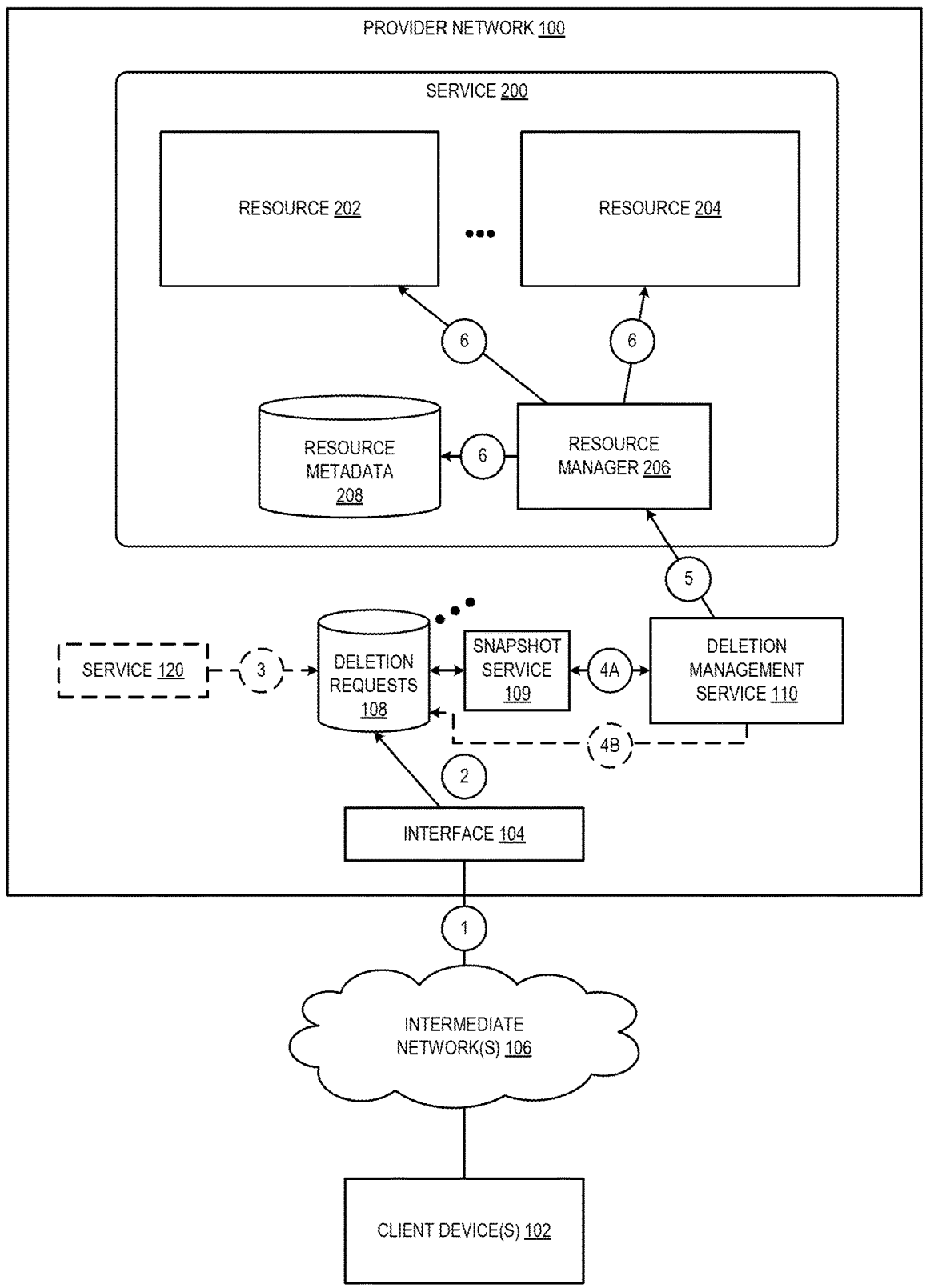
FIG. 2 is a diagram illustrating an environment for dynamic throttling of resource deletion according to some embodiments.

FIG. 2 is a diagram illustrating an environment for dynamic throttling of resource deletion according to some embodiments. As discussed, a deletion management service 110 can manage deletion requests for a variety of resources 202, 204 managed by a variety of services 200. For example, service 200 can be a hardware virtualization service that manages resources 202, 204, such as compute resources (e.g., executing VM instances and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc.

The service may include a resource manager 206 that is responsible for managing the lifecycle of resources 202, 204, resource metadata 208, and any other data related to resources 202, 204. When a deletion request is received from a customer at numeral 1 via interface 104, the request can be augmented by the interface 104 to include metadata (e.g., timestamp, requestor ID, etc.). At numeral 2, the interface 104 can store the augmented requests in deletion requests data store 108. As discussed above, deletion requests data store 108 can store requests received from customers via interface 104 as well as requests received from a service 120 at numeral 3. For example, as discussed above, such service-originating requests may include legitimate requests (e.g., to perform cleanup of partially provisioned resources) and illegitimate requests which may be due bugs in service 200, service 120, provider network 100, etc. Similar to FIG. 1, deletion management service 110 can obtain a batch of deletion requests from deletion request data store 108 (or a plurality of deletion request data stores) at numeral 4A. In some embodiments, the deletion management service may additionally, or alternatively, obtain deletion requests from the deletion request data store 108 directly, as shown at numeral 4B. As discussed, in some embodiments, the batch of deletion requests may only correspond to deletion requests associated with resources that can be reclaimed by the service 200, such as customer-owned resources.

The deletion requests in the batch obtained from deletion management service 110 that are received from a customer include timestamp data added by interface 104 when the requests were processed. As discussed, these timestamps can be used by deletion management service 110 to determine the rate at which customer deletion requests are being received. Hard delete tasks may then be throttled based on this rate when they are sent to resource manager 206 at numeral 5. Resource manager 206 can then execute the hard delete tasks to hard delete the requested resources at numeral 6.

Figure 3:
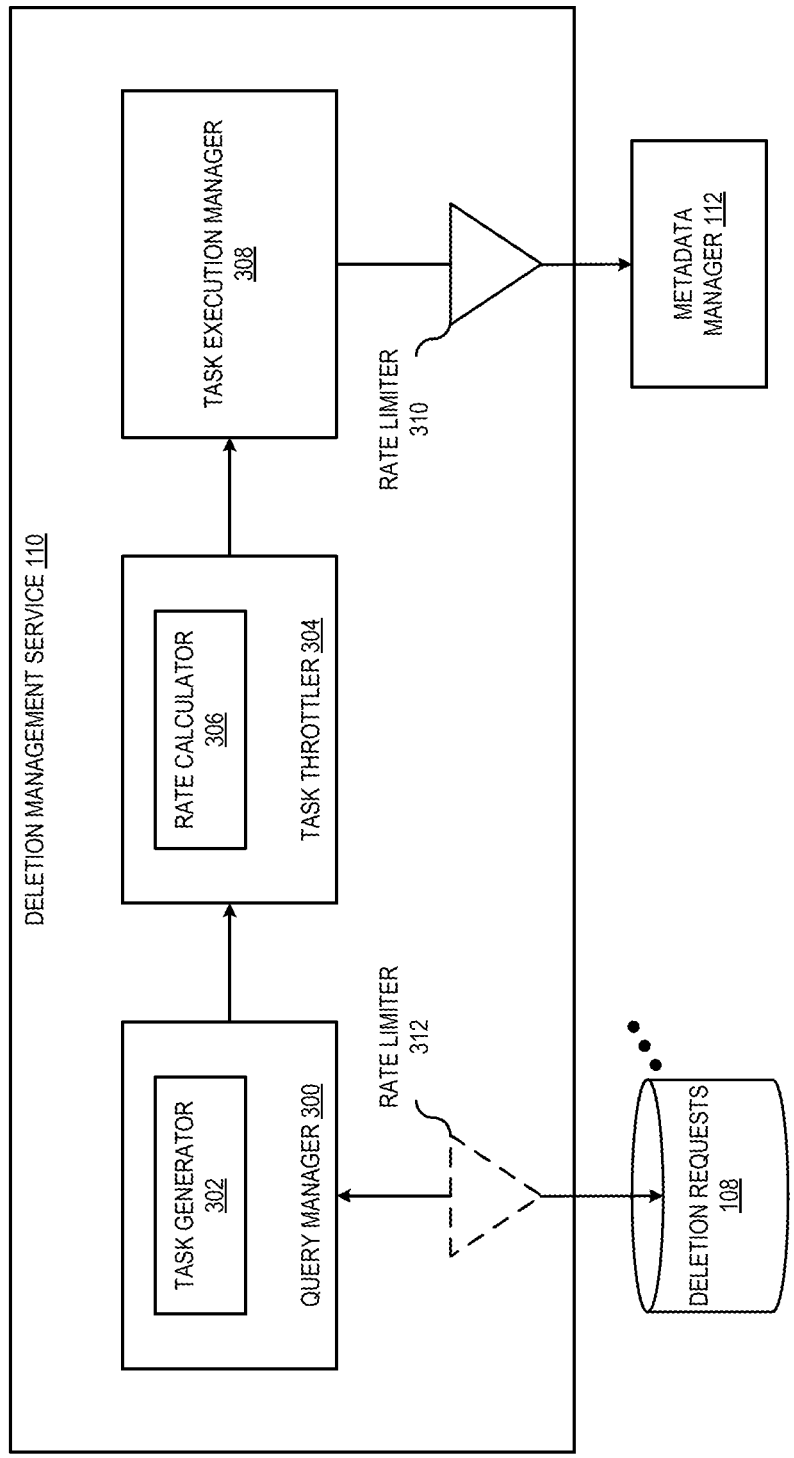
FIG. 3 is a diagram illustrating a deletion manager according to some embodiments.

FIG. 3 is a diagram illustrating a deletion manager according to some embodiments. As shown in FIG. 3, deletion manager 110 may include a query manager 300. Query manager 300 can retrieve deletion requests from deletion requests data store 108. As described, deletion requests data store can include deletion requests received from client devices (e.g., customer devices) 102 or from a service 120. Each deletion request can identify a resource to be deleted. Deletion requests received through interface 104 can further include a timestamp that is added by the interface as the requests are received. The query manager 300 can periodically retrieve a batch of deletion requests. Optionally, a second rate limiter 312 may limit the rate at which deletion requests are received by the deletion management service 110 from deletion requests data store 108. In some embodiments, the query manager 300 can do a range query based on start and end timestamp to retrieve a batch of deletion requests.

Query manager 300 can include task generator 302 which can generate a hard-delete task corresponding to each deletion request retrieved from deletion requests data store 108. For example, depending on the type of resource to be deleted, task generator 302 can generate an appropriate deletion task for that resource. The hard delete tasks can then be passed to task throttler 304. Task throttler 304 can include a rate calculator 306. The rate calculator can determine a customer request rate using the metadata associated with the deletion requests. The metadata may include the timestamps associated with the requests that are received via interface 104. Once the customer request rate has been determined, the customer request rate can be used by rate limiter 310 to dynamically throttle the hard delete requests as they are passed to metadata manager 112 to be executed. As discussed above, in some embodiments, the hard delete requests can be passed to a resource manager 206 to hard delete the requested resource. In some embodiments, the deletion request rate may be calculated for each batch and used only to execute the hard delete tasks generated for that batch. In some embodiments, a new deletion request rate can be determined for each batch. Alternatively, in some embodiments, the previous deletion request rate can be modified based on the new deletion request rate. For example, if the new deletion request rate is within a threshold difference of the previous deletion request rate, then the new deletion request rate can be used for the new batch of hard delete tasks. Additionally, or alternatively, if the magnitude of a difference between the new deletion request rate and the previous deletion request rate is greater than a threshold, then the previous deletion request rate can be increased or decreased by a predetermined value. For example, if the previous deletion request rate is 1, the new deletion request rate is 10, and the rate change threshold is 5, then the rate limited may limit the rate to 6 (e.g., the old deletion request rate plus the maximum rate change value).

In some embodiments, the average deletion request rate can be calculated according to the following equation:

$n$ task timestamps: $t_1, t_2, \ldots t_n$ $$\text{Average Rate } (AR) = \text{mean}\left[\frac{1}{t_2 - t_1}, \frac{1}{t_3 - t_2}, \ldots, \frac{1}{t_n - t_{n-1}}\right]$$

Alternatively, the average deletion request rate can be calculated according to the following equation:

$n$ task timestamps: $t_1, t_2, \ldots t_n$ $$\text{Average Rate } (AR) = \text{median}\left[\frac{1}{t_2 - t_1}, \frac{1}{t_3 - t_2}, \ldots, \frac{1}{t_n - t_{n-1}}\right]$$

In some embodiments, the average rate can then be used to determine a number of tasks to process in a given time period according to the following equation:

Number of Tasks=$AR \times (t_n - t_1)$

Task execution manager 308 may then be limited to sending a number of hard delete tasks to metadata manager 112 (or other resource manager 206) by rate limiter 310. For example, as shown above, the deletion request rate (e.g., average rate) can be multiplied by the current time period to determine a number of tasks that can be processed in that time period. If that number is greater than or equal to the number of tasks to be processed, then all tasks may be processed. If that number if less than the number of tasks to be processed, then some of the tasks will be added to a task backlog. In some embodiments, a random sample of the hard delete tasks can be sent to the metadata manager 112 (or other resource manager 206) to be executed. In some embodiments, each deletion request may be associated with an identifier associated with the requestor (e.g., customer ID, account ID, service ID, originating URL, URI, or other identifier). The task throttler may first select hard delete requests associated with one or more customer IDs while throttling requests associated with one or more service IDs. In some embodiments, the hard delete requests associated with some identifiers may be abandoned or diverted to another service and/or user to ensure the requests are valid before they are executed. In some embodiments, requests to delete resources that appear to be in use (e.g., resources that include user data) may be throttled and requests to delete resources that appear not to be in use (e.g., resources that do not include user data) may be processed first.

In some embodiments, a running threshold may be used to throttle the number of tasks being executed in a given time period. In some embodiments, the average rate may be calculated across multiple deletion management service hosts. Each host can store its rate in a storage location (e.g., data store, database table, etc.) that is accessible to each host.

Each host can then calculate an aggregate average rate based on the average rates from each host.

Figure 4:
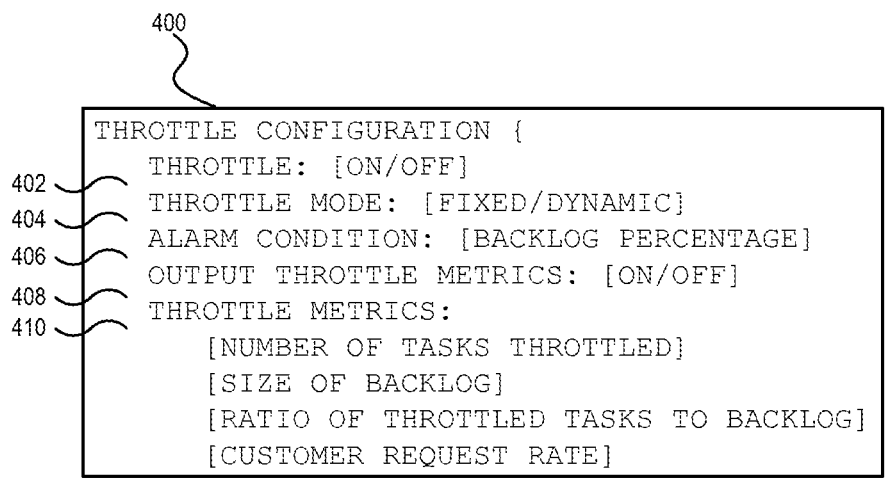
FIG. 4 is a diagram illustrating throttle configuration data according to some embodiments.

FIG. 4 is a diagram illustrating throttle configuration data according to some embodiments. The throttle configuration data 400 can be provided by an administrator, customer, or other entity, to define how deletion requests are to be managed for all or a portion of managed resources in provider network 100. As shown in FIG. 4, throttle configuration 400 can control whether throttling is active at 402. If throttling is turned on, then the throttling techniques described herein may be implemented as discussed above. If throttling is turned off, then hard delete tasks may be generated and executed in batches as the soft delete requests are obtained. In some embodiments, the throttling mode (e.g., dynamic or static) can be selected at 404. In dynamic mode, the throttle may dynamically track the rate at which customer soft delete requests are received, as described above. In static mode, the throttle may be a fixed rate. In some embodiments, the fixed rate may be defined by the deletion management service or the fixed rate may be defined by a user, administrator, or other entity. For example, the fixed rate may be defined through a configuration value provided in throttle configuration 400 (not shown).

In some embodiments, the throttle configuration 400 may further include one or more alarm conditions 406. As shown, the alarm condition may be defined as a percentage of tasks being throttled (e.g., the current backlog percentage). If the alarm condition is met this may indicate that some event is causing a spike of deletion requests, or the throttle has been incorrectly set and is leading to a large backlog. If the alarm condition is met, an alarm message may be generated and sent to an administrator, a customer, or other entity. To determine whether an alarm condition is met, the deletion management service can track one or more throttle metrics. In some embodiments, the throttle configuration 400 can define whether metrics are to be output at 408. These metrics 410 may include a number of tasks throttled, a size of the backlog, a ratio of the number of throttled tasks to the size of the backlog, and/or a customer request rate. In some embodiments, an overall request rate can be calculated that includes service-originating requests and customer-originating requests. The throttle metrics may include the overall request rate in addition to the customer request rate. As discussed, in some embodiments, the change in the throttle may be limited by upper or lower bounds (e.g., to prevent the throttle threshold from changing too quickly). In such embodiments, those bounds may also be output with throttle metrics 400.

Figure 5:
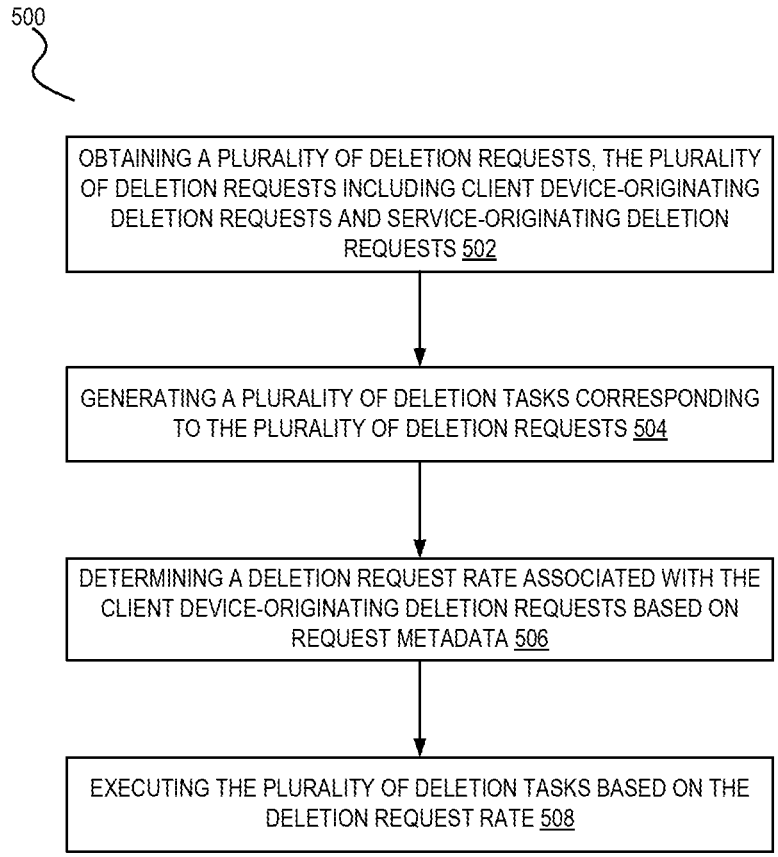
FIG. 5 is a flow diagram illustrating operations of a method for dynamic throttling of capacity reclamation according to some embodiments.

FIG. 5 is a flow diagram illustrating operations 500 of a method for dynamic throttling of capacity reclamation according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by deletion manager 110, metadata manager 112, resource manager 206, etc. of the other figures.

The operations 500 include, at block 502, obtaining a plurality of deletion requests, the plurality of deletion requests including client device-originating deletion requests and service-originating deletion requests. In some embodiments, obtaining a plurality of deletion requests, the plurality of deletion requests including client device-originating deletion requests and service-originating deletion requests, may further include querying a data store that includes the plurality of deletion requests, wherein the plurality of deletion requests are associated with resource metadata to be hard deleted. In some embodiments, first resource metadata is associated with a first storage volume in a storage service, wherein the first resource metadata includes a reference to the first storage volume and a reference to a first backup storage volume associated with the first storage volume. The operations 500 further include, at block 504, generating a plurality of deletion tasks corresponding to the plurality of deletion requests.

The operations 500 further include, at block 506, determining a deletion request rate associated with the client device-originating deletion requests based on request metadata. In some embodiments, the request metadata includes a timestamp associated with each of the client device-originating deletion requests. In some embodiments, determining a deletion rate associated with the client device-originating deletion requests may include identifying consecutive pairs of deletion requests from the plurality of deletion requests, determining a time interval associated with each consecutive pair of deletion requests, and determining an average rate for the plurality of deletion requests based on the time interval associated with each consecutive pair of deletion requests. In some embodiments, the average rate is determined as a mean value or a median value. The operations 500 further include, at block 508, executing the plurality of deletion tasks based on the deletion request rate.

In some embodiments, the operations may further include obtaining a second plurality of deletion requests, and determining a new deletion request rate based on second request metadata associated with the second plurality of deletion requests, the new deletion request rate within a threshold value of the deletion request rate. In some embodiments, the operations may further include generating a plurality of processing metrics associated with execution of the plurality of deletion tasks, the plurality of processing metrics including a number of deletion tasks being throttled, a size of a deletion task backlog, and a ratio of the number of deletion tasks being throttled to the size of the deletion task backlog. In some embodiments, the operations may further include determining the ratio of the number of deletion tasks being throttled to the size of the deletion task backlog exceeds an alarm threshold, and generating an alarm.

In some embodiments, the operations may include querying a deletion request database to obtain a plurality of storage volume deletion requests, the plurality of storage volume deletion requests associated with a plurality of storage volumes in a storage service, and the plurality of storage volume deletion requests including customer-originating deletion requests and service-originating deletion requests, generating a plurality of deletion tasks corresponding to the plurality of storage volume deletion requests, wherein, when performed, each of the plurality of deletion tasks operates to hard delete volume metadata associated with a corresponding one of the plurality of storage volumes, determining a deletion request rate associated with the customer-originating deletion requests based on timestamps associated with each of the customer-originating deletion requests, and executing the plurality of deletion tasks based on the deletion request rate. In some embodiments, each storage volume from the plurality of storage volumes is associated with at least one backup storage volume. In some embodiments, the backup metadata for a first storage volume includes a first internet protocol (IP) address associated with the first storage volume and a second IP address associated with a first backup storage volume associated with the first storage volume.

Figure 6:
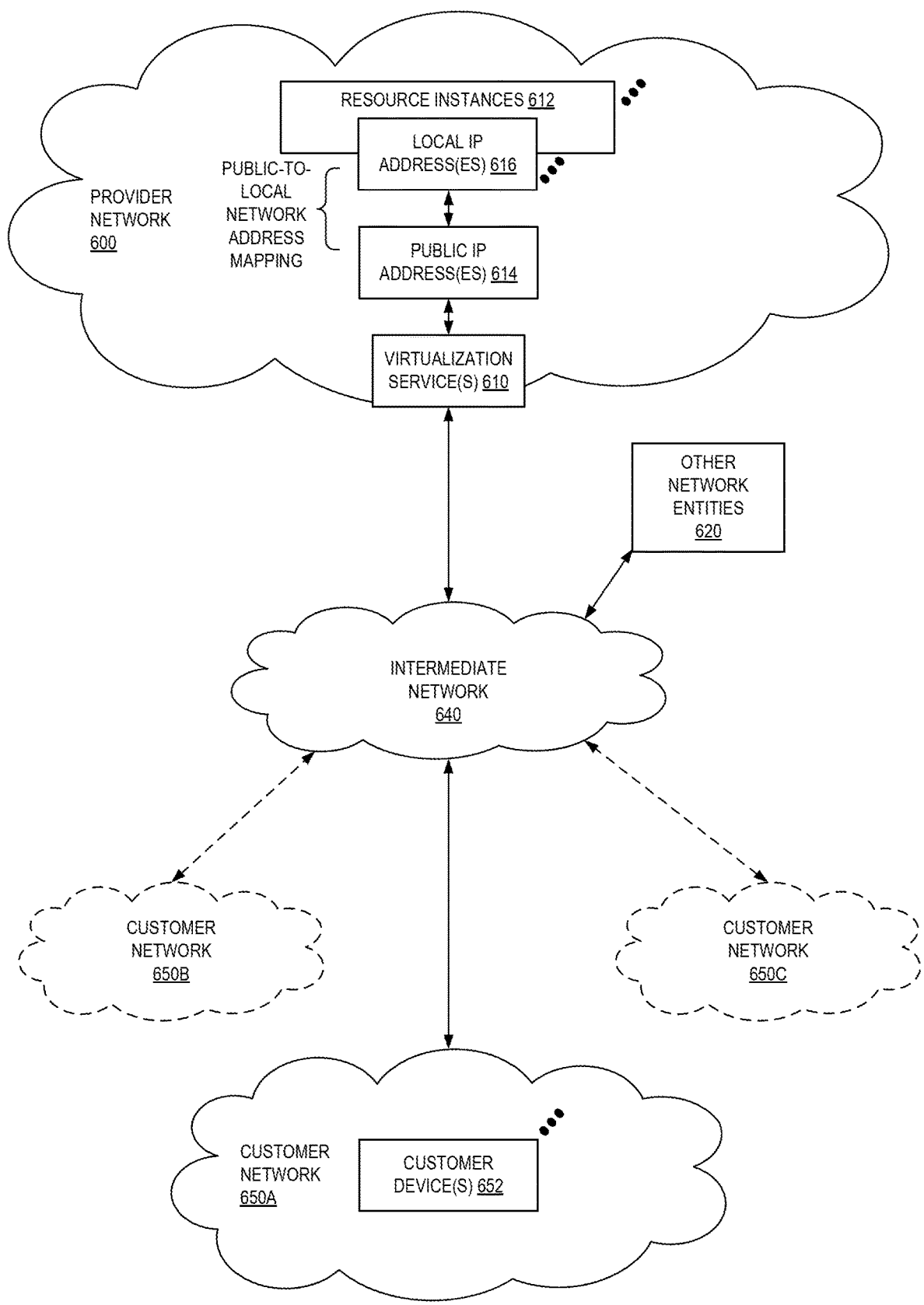
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
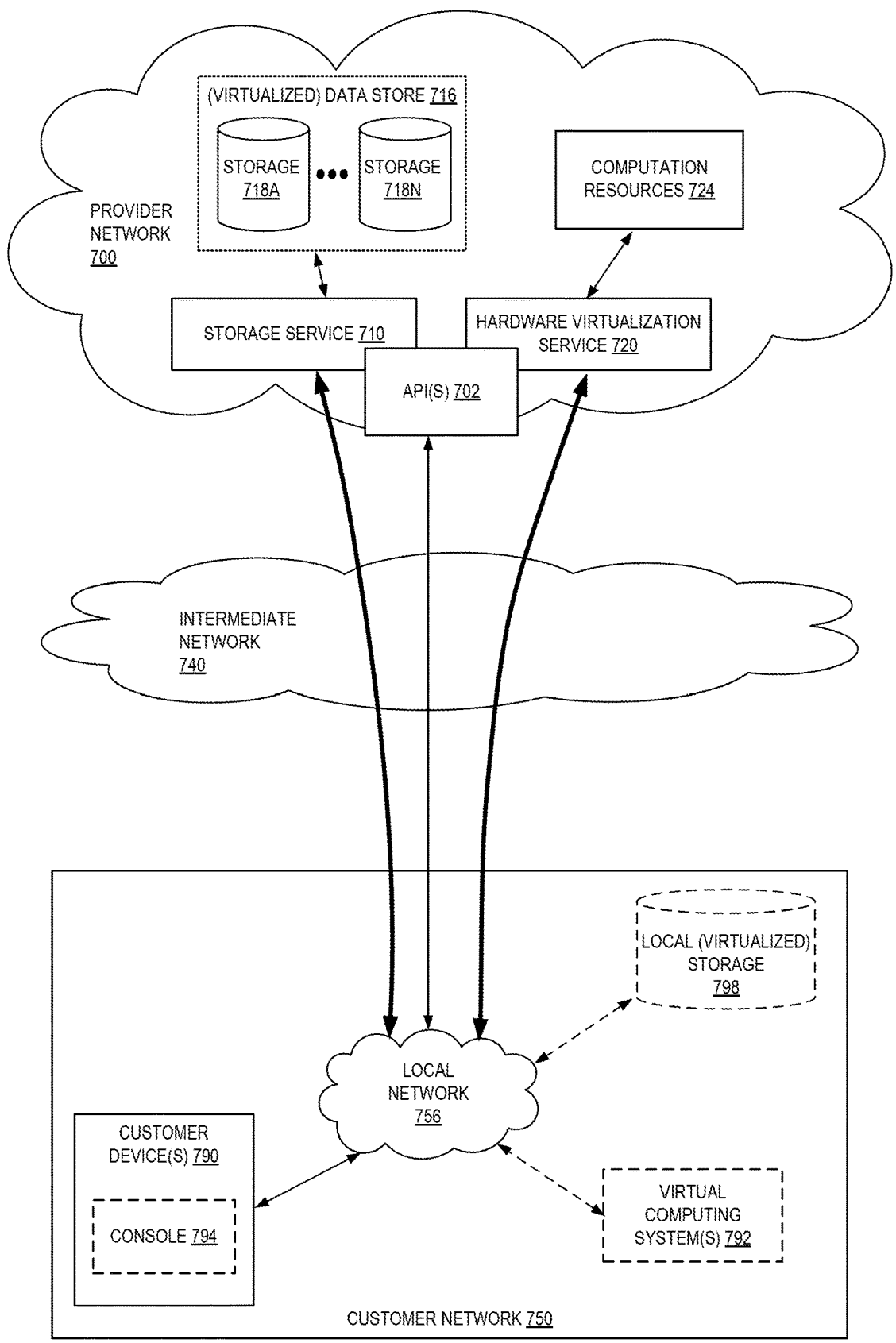
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
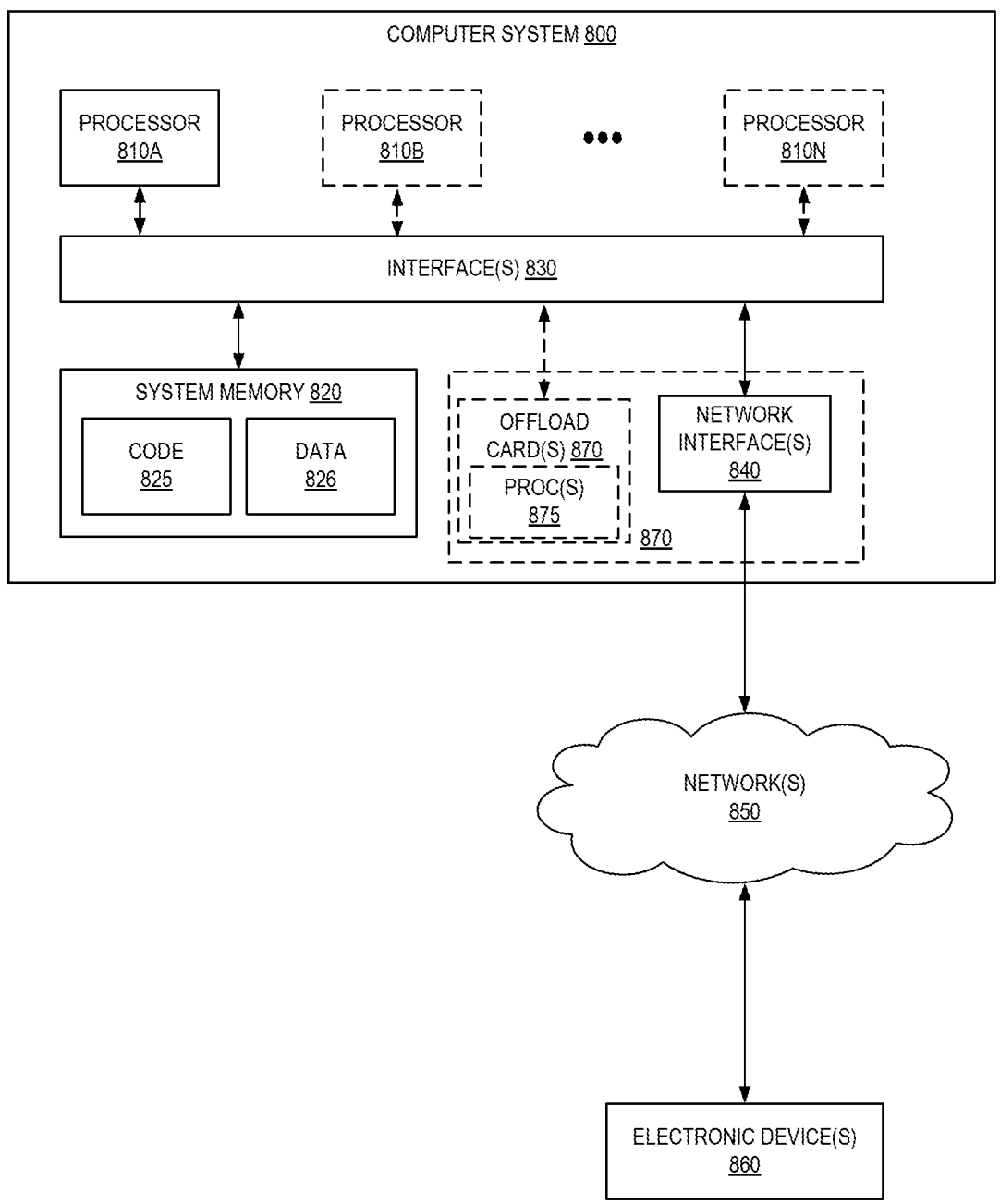
FIG. 8 is a block diagram illustrating an example computer system that may be used in some embodiments.

In some embodiments, a system that implements a portion or all of the techniques for throttling capacity reclamation operations as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above.

However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   querying a deletion request database to obtain a plurality of storage volume deletion requests, the plurality of storage volume deletion requests associated with a plurality of storage volumes in a storage service, and the plurality of storage volume deletion requests including customer-originating deletion requests and service-originating deletion requests;
   generating a plurality of deletion tasks corresponding to the plurality of storage volume deletion requests, wherein, when performed, each of the plurality of deletion tasks operates to hard delete volume metadata associated with a corresponding one of the plurality of storage volumes;
   determining a deletion request rate associated with the customer-originating deletion requests based on timestamps associated with each of the customer-originating deletion requests; and
   executing the plurality of deletion tasks based on the deletion request rate.

2. The computer-implemented method of claim 1, wherein each storage volume from the plurality of storage volumes is associated with at least one backup storage volume.

3. The computer-implemented method of claim 2, wherein the backup metadata for a first storage volume includes a first internet protocol (IP) address associated with the first storage volume and a second IP address associated with a first backup storage volume associated with the first storage volume.

4. A computer-implemented method comprising:
   obtaining a plurality of deletion requests, the plurality of deletion requests including client device-originating deletion requests and service-originating deletion requests;
   generating a plurality of deletion tasks corresponding to the plurality of deletion requests;
   determining a deletion request rate associated with the client device-originating deletion requests based on request metadata, wherein the request metadata includes a timestamp associated with each of the client device-originating deletion requests; and
   executing the plurality of deletion tasks based on the deletion request rate.

5. The computer-implemented method of claim 4, wherein determining a deletion request rate associated with the client device-originating deletion requests based on request metadata further comprises:
   identifying consecutive pairs of deletion requests from the plurality of deletion requests;
   determining a time interval associated with each consecutive pair of deletion requests; and
   determining an average rate for the plurality of deletion requests based on the time interval associated with each consecutive pair of deletion requests.

6. The computer-implemented method of claim 5, wherein the average rate is determined as a mean value or a median value.

7. The computer-implemented method of claim 4, further comprising:
   obtaining a second plurality of deletion requests; and
   determining a new deletion request rate based on second request metadata associated with the second plurality of deletion requests, the new deletion request rate within a threshold value of the deletion request rate.

8. The computer-implemented method of claim 4, wherein obtaining a plurality of deletion requests, the plurality of deletion requests including client device-originating deletion requests and service-originating deletion requests, further comprises:

querying a data store that includes the plurality of deletion requests, wherein the plurality of deletion requests are associated with resource metadata to be hard deleted.

9. The computer-implemented method of claim 8, wherein querying a data store that includes the plurality of deletion requests further comprises:

querying a plurality of data stores, wherein the plurality of deletion requests are stored across the plurality of data stores.

10. The computer-implemented method of claim 8, wherein first resource metadata is associated with a first storage volume in a storage service, wherein the first resource metadata includes a reference to the first storage volume and a reference to a first backup storage volume associated with the first storage volume.

11. The computer-implemented method of claim 4, further comprising:

generating a plurality of processing metrics associated with execution of the plurality of deletion tasks, the plurality of processing metrics including a number of deletion tasks being throttled, a size of a deletion task backlog, and a ratio of the number of deletion tasks being throttled to the size of the deletion task backlog.

12. The computer-implemented method of claim 11, further comprising:

determining the ratio of the number of deletion tasks being throttled to the size of the deletion task backlog exceeds an alarm threshold; and generating an alarm.

13. A system comprising:

a storage service implemented by a first one or more electronic devices; and a deletion management service implemented by a second one or more electronic devices, the deletion management service including instructions that upon execution cause the deletion management service to:

obtain a plurality of deletion requests, the plurality of deletion requests including client device-originating deletion requests and service-originating deletion requests;

generate a plurality of deletion tasks corresponding to the plurality of deletion requests;

determine a deletion request rate associated with the client device-originating deletion requests based on request metadata, wherein the request metadata includes a timestamp associated with each of the client device-originating deletion requests; and execute the plurality of deletion tasks based on the deletion request rate.

14. The system of claim 13, wherein to determine a deletion request rate associated with the client device-originating deletion requests based on request metadata, the instructions, when executed, further cause the deletion manager to:

identify consecutive pairs of deletion requests from the plurality of deletion requests;

determine a time interval associated with each consecutive pair of deletion requests; and determine an average rate for the plurality of deletion requests based on the time interval associated with each consecutive pair of deletion requests.

15. The system of claim 14, wherein the average rate is determined as a mean value or a median value.

16. The system of claim 12, wherein the instructions, when executed, further cause the deletion manager to:

obtain a second plurality of deletion requests; and determine a new deletion request rate based on second request metadata associated with the second plurality of deletion requests, the new deletion request rate within a threshold value of the deletion request rate.

17. The system of claim 12, wherein to obtain a plurality of deletion requests, the plurality of deletion requests including client device-originating deletion requests and service-originating deletion requests, the instructions, when executed, further cause the deletion manager to:

query a data store that includes the plurality of deletion requests, wherein the plurality of deletion requests are associated with resource metadata to be hard deleted.

18. The system of claim 16, wherein to query a data store that includes the plurality of deletion requests, the instructions, when executed, further cause the deletion manager to:

query a plurality of data stores, wherein the plurality of deletion requests are stored across the plurality of data stores.

\* \* \* \* \*